United States Patent [19]

Matsuzaki

[11] Patent Number: 5,043,401

[45] Date of Patent: Aug. 27, 1991

[54] POWDER COATING COMPOSITION BASED ON MIXED BISPHENOL EPOXY RESINS, POLYESTER RESIN AND CURING AGENT

[75] Inventor: Kunimitsu Matsuzaki, Yono, Japan

[73] Assignee: Somar Corporation, Japan

[21] Appl. No.: 417,715

[22] Filed: Oct. 5, 1989

[30] Foreign Application Priority Data

Oct. 7, 1988 [JP] Japan .................. 63-253566

[51] Int. Cl.$^5$ .................. C08L 63/02; C08L 67/02
[52] U.S. Cl. .................. 525/438; 525/113; 525/934; 523/427; 523/428; 523/429; 523/434
[58] Field of Search .................. 525/438, 113, 934; 523/427, 428, 429, 434

[56] References Cited

U.S. PATENT DOCUMENTS 3,647,726  3/1972  Ulmer .................. 523/429
4,223,097  9/1980  Johannes et al. .................. 525/438

FOREIGN PATENT DOCUMENTS 60-186578  9/1985  Japan .
60-193970  8/1988  Japan .
63-221174  9/1988  Japan .

*Primary Examiner*—Earl Nielsen
*Assistant Examiner*—Frederick Krass
*Attorney, Agent, or Firm*—Lorusso & Loud

[57] ABSTRACT

A powder coating composition suitable for slot insulation is disclosed which includes an epoxy resin containing at least 60% by weight of a mixture of a first glycidyl ether of bisphenol A having a number average molecular weight of 2500-8000 with a second glycidyl ether of bisphenol A having a number average molecular weight of 350-1700, the mixture having a number average molecular weight of 1600-4600, a carboxyl group-terminated polyester resin in an amount of 5-100 parts by weight per 100 parts by weight of the epoxy resin, a curing agent, and an inorganic filler in an amount of 10-80% by weight.

7 Claims, No Drawings

POWDER COATING COMPOSITION BASED ON MIXED BISPHENOL EPOXY RESINS, POLYESTER RESIN AND CURING AGENT

BACKGROUND OF THE INVENTION

This invention relates generally to a powder coating composition and, more specifically, to a thermosetting epoxy resin powder coating composition useful for application to slot insulation purposes.

There are known epoxy resin powder coating compositions useful for forming electrically insulating deposits or layers on electric or electronic parts. For example, Japanese published unexamined patent applications (Tokkyo Kokai) Nos. 55-84371 and 57-42760 disclose powder coating compositions containing an epoxy resin modified with a rubber, and a curing agent. While these powder compositions are effective for forming insulating deposits or layers on flat surfaces, they are ill-suited for the insulation of edge portions such as of slots of rotors or stators of electric motors. In particular, powder coating is generally performed at a temperature of 180° C. or more so as to effect the coating within a short period of time. At such a temperature, sharp edge portions often failed to be coated with the conventional coating composition or, if coated, the coated layer is not satisfactory because it lacks resistance to heat, impact strength, surface smoothness or adhesion strength.

BRIEF SUMMARY OF THE INVENTION

It is, therefore, an object of the present invention to provide a powder coating composition which is devoid of the drawbacks of the known powder coating composition.

Another object of the present invention is to provide a powder coating composition which can form an electrically insulating deposit or layer on a metal body to be coated within a short period of time.

It is a special object of the present invention to provide a homogeneous, powder coating composition which is suited for slot insulation purposes.

It is yet a further object of the present invention to provide a powder coating composition which gives a coating having excellent electrical insulation, thermal resistance, impact strength, surface smoothness and adhesion strength.

In accomplishing the foregoing objects, there is provided in accordance with the present invention a powder coating composition comprising:

an epoxy resin containing at least 60% by weight of a mixture of a first glycidyl ether of bisphenol A having a number average molecular weight of 2500-8000 with a second glycidyl ether of bisphenol A having a number average molecular weight of 350-1700, said mixture having a number average molecular weight of 1600-4600;

a carboxyl group-terminated polyester resin in an amount of 5-100 parts by weight per 100 parts by weight of said epoxy resin;

a curing agent; and an inorganic filler.

Other objects, features and advantages of the present invention will become apparent from the detailed description of the invention to follow.

DETAILED DESCRIPTION OF THE INVENTION

The epoxy resin to be used in the present invention contains as a major component a mixture of a first glycidyl ether of bisphenol A having a number average molecular weight of 2500-8000, preferably 2700-6500 with a second glycidyl ether of bisphenol A having a number average molecular weight of 350-1700, preferably 350-500. The mixture has a number average molecular weight of 1600-4600, preferably 1800-4000, more preferably 2000-3000. A molecular weight of the mixture below 1600 is undesirable because the resulting composition becomes low in edge covering so that an edge portion of, for example, a slot is failed to be covered with a coating of the resin. Too high a molecular weight in excess of 4600 is also undesirable because the adhesion strength of the coated layer becomes low and because pin holes are formed in the coated layer. The first glycidyl ether generally has a melting point of 120°-160° C., preferably 130°-150° C., while the second glycidyl ether generally has a melting point of 75° C. or less.

The epoxy resin may further contain up to 40% by weight of a polyfunctional epoxy resin having at least three epoxy groups in its molecule. Such polyfunctional epoxy resins may include novolak epoxy resins such as orthocresol novolak resins and phenol novolak resins; triglycidyl ether epoxy resins such as epoxidized cyanuric acids and epoxidized triphenylpropanes; and tetraglycidyl ether epoxy resins such as epoxidized bisresorcinol F and epoxidized tetraoxytetraphenylethanes. The use of the polyfunctional epoxy resin may improve thermal resistance of coated layers. The amount of the polyfunctional epoxy resin is preferably 5-35% by weight, more preferably 10-30% by weight.

The carboxyl group containing polyester resin to be used in the present invention may be obtained by polymerization of a saturated polycarboxylic acid or an aromatic polycarboxylic acid with a saturated polyhydric alcohol and has carboxylic acid groups at the both terminal ends thereof. The polyester resin is preferably a powder having a softening point of 70°-120° C., an acid value of 30-150 (KOH mg/g), a number average molecular weight of 600-2500 and an average particle size of 100-500 μm. More preferably, the polyester resin has a softening point of 75°-90° C. and an average particle size of 130-250 μm. The polyester resin exhibiting rubber-like properties or noncrystalline properties is preferably used.

Examples of suitable polyester resins include copolymerized polyethylene terephthalates obtained from ethylene glycol, terephthalic acid and an aliphatic dicarboxylic acid having 6-12 carbons such as adipic acid or sebacic acid. The amount of the aliphatic dicarboxylic acid is generally 15-40 molar %, preferably 20-30 molar % based on a total of the ethylene glycol, terephthalic acid and aliphatic dicarboxylic acid. The molar ratio of the ethylene glycol to a total of the terephthalic acid and the aliphatic dicarboxylic acid is 1:1.

The curing agent to be used in the present invention may be an aromatic amine, an acid anhydride, a guanidine (such as dicyanodiamide) or an imidazole compound. The curing agent is used in an amount sufficient to cure the epoxy resin. The amount of the curing agent varies with the kind thereof. For example, an imidazole compound curing agent is used in an amount of 0.1-5 parts by weight, preferably 0.2-4 parts by weight per 100 parts by weight of the epoxy resin.

It is advisable to use a combination of two kinds of curing agents showing different curing time so as to control the curing rate of the powder composition within a suitable range of 3-60 minutes at 160°-260° C. When the curing time is excessively fast, the coated layer becomes poor in gloss and in adhesion strength. On the other hand, too slow a curing time causes lowering of edge covering.

It is especially preferable to use as the curing agent a mixture of a first imidazole compound expressed by the general formula:

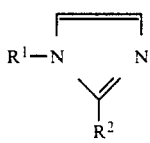

wherein $R^1$ represents hydrogen, an alkyl or an aralkyl and $R^2$ represents an alkyl or aryl, and a second imidazole compound expressed by the general formula:

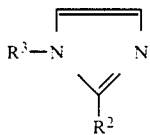

wherein $R^3$ represents a cyanoalkyl or a triazine-containing alkyl and $R^2$ has the same meaning as above.

Suitable examples of the substituents $R^1$, $R^2$ and $R^3$ are as follows:

$R^1$: H, $CH_3$, $C_2H_5$ and $CH_2C_6H_5$ $R^2$: $CH_3$, $C_2H_5$, $CH(CH_3)_2$, $C_{11}H_{23}$, $C_{17}H_{35}$ and $C_6H_6$;

$R^3$: $CH_2CH_2CN$ and

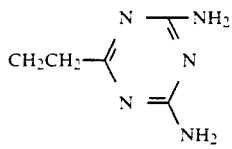

The amounts of the first and second imidazole compounds are 0.05-0.7 part by weight and 0.5-3 parts by weight, respectively, per 100 parts by weight of the epoxy resin.

It is important to incorporate an inorganic filler into the powder coating composition of the present invention in an amount of 10-80% by weight, preferably 20-50% by weight based on the weight of the coating composition. Illustrative of suitable fillers are silica, calcium carbonate, alumina, clay, mica, talc and glass fiber powder. The average particle size of the filler is generally in the range of 0.01-100 μm.

It is desirable to incorporate a reaction accelerator for facilitating the reaction of the epoxy resin with the polyester. Examples of suitable accelerators include quarternary ammonium salts such as acetylcholine chloride, metal salts of fatty acids such as Ca, Mg, Zn and Sn salts of stearic acid or palmitic acid, epoxy resin curing accelerators such as tertiary amines.

The powder coating composition of the present invention may further contain various conventional additives such as a leveling agent (e.g. an acrylate oligomer), pigment and a curing accelerator.

The powder composition may be prepared by a method including the steps of mixing, in a dry state, the above ingredients by means of a mixer, mixing the resulting mixture, while maintaining the epoxy resin in a molten state, by means of a kneader or an extruder, cooling the resulting mixture for solidification, and then pulverizing the solidified mixture into fine particulate with a particle size of, for example, 100 mesh (Tyler) or finer. More specifically, a finely divided polyester resin is mixed with a melted epoxy resin and the mixture is commingled while preventing the polyester from being melted. In this case, it is preferred that the polyester be previously co-pulverized together with 5-25 parts by weight, more preferably 10-20 parts by weight of an inorganic filler, especially calcium carbonate per 100 parts by weight of the polyester resin. By this, the pulverization of the polyester is facilitated and, moreover, the resulting powder can be easily homogeneously mixed with the melted epoxy resin while preventing the blocking or agglomeration of the powder.

The powder coating composition is suited for application to slot insulation wherein a rotor or stator core provided with slots is heated at a temperature of 180°-260° C. and is contacted with a mass of a fluidized layer of the coating composition. Static coating may also be adopted for the formation of slot insulation layer.

The following examples will further illustrate the present invention. In the examples, "part" is by weight.

EXAMPLE 1

A powder coating composition consisting of the following ingredients was prepared:

| | |
|---|---|
| Glycidyl ether of bisphenol A (I) *1 (number average molecular weight: 2900) | 65 parts |
| Glycidyl ether of bisphenol A (II) *2 (number average molecular weight: 1600) | 10 parts |
| Cresol novolak epoxy resin *3 (number average molecular weight: 1180) | 25 parts |
| Calcium carbonate (average particle size: 6 μm) | 40 parts |
| Acrylate oligomer *4 | 0.3 part |
| Polyester resin *5 (average molecular weight: 3200) | 15 parts |
| Triazine adduct of 2-methylimidazole *6 | 2.5 parts |
| Pigment ($Fe_2O_3$) | 0.2 part |
| Pigment ($Fe_3O_4$) | 0.4 part |

*1 Epikote 1007 (manufactured by Yuka-Shell Epoxy Inc.), softening point: 128° C.
*2 Epikote 1004 (manufactured by Yuka-Shell Epoxy Inc.), softening point: 97° C.
*3 ECN-280 (manufactured by Nihon Kayaku K. K.), softening point: 83° C.
*4 Nikalite (manufactured by Nihon Carbite K. K.), average molecular weight: 3,000
*5 GV-23 (manufactured by Nihon Yupica Inc.), acid value: 54 (KOH mg/g), softening point: 97° C.
*6: 2MZ-A (manufactured by Shikoku Kasei Kogyo K.K.)

The weight average molecular weight of the bisphenol A glycidyl ether-type epoxy resin (i.e. mixture of the glycidyl ethers (I) and (II)) contained in the above composition is 2700.

EXAMPLE 2

A powder coating composition having the same composition as that of Example 1 except that, as the polyester resin, ER-8100 (manufactured by Nihon Ester Inc.) having an acid value of 65 (KOH mg/g), a softening point of 84° C. and an average molecular weight of 2800 was used in place of GU-230 was prepared.

EXAMPLE 3

A powder coating composition having the same composition as that of Example 1 except that the amount of the polyester resin (GU-230) was increased to 30 parts was prepared.

EXAMPLE 4

A powder coating composition having the same composition as that of Example 1 except that the amount of the polyester resin (GU-230) was increased to 50 parts was prepared.

EXAMPLE 5

A powder coating composition having the same composition as that of Example 2 except that the amount of the polyester resin (ER-8100) was increased to 50 part was prepared.

COMPARATIVE EXAMPLE 1

A powder coating composition having the same composition as that of Example 1 except that the amount of the polyester resin (GU-230) was increased to 150 parts and that 0.4 part of acetylcholine chloride was further incorporated thereinto was prepared.

COMPARATIVE EXAMPLE 2

A powder coating composition having the same composition as that of Example 1 except that no polyester resin was used and that 5 parts of rubber powder (Nipol HF21(NBR), manufactured by Nihon Zeon Inc.) were further incorporated thereinto was prepared.

COMPARATIVE EXAMPLE 3

A powder coating composition having the same composition as that of Comparative Example 2 except that the amount of the rubber powder was increased to 10 parts was prepared.

EXAMPLE 6

Each of the above compositions was tested for physical and mechanical properties thereof as well as of coatings obtained therefrom by a fluidized bed coating method performed at a temperature of 180°-260° C. The test results were as summarized in Table 1 below. The tests were carried out as follows:

Edge Covering Test:

A ¼ inch square rod formed of iron was subjected to powder coating to form a coat having a thickness of about 0.3 mm. Edge covering of the coat was measured in accordance with ASTM D2967. The edge covering is defined as De/Df ($\times 100\%$) where De represents the thickness of the coat at the rectangular edge portion of the square rod and Df represents the thickness of the coat at a flat portion.

Impact Strength Test:

A 60 mm $\times$ 60 mm square iron plate with a thickness of 3.2 mm was subjected to powder coating to form a coat having a thickness of about 0.3 mm. The resulting coat was subjected to impact strength test using a Du Pont impact strength testing machine in the following manner: A hammer having a semispherical hitting portion and weighing 1 kg is positioned above a stationary support provided with a concave portion which may fit with the hitting portion of the hammer. After a sample has been placed on the support, the hammer is dropped thereonto. The minimum height of the hammer which causes a crack of the coat of the sample as a result of the drop thereof represents the impact strength of the coat. The impact strength is rated as follows:

| Height (cm) | Evaluation |
|---|---|
| 40-50 | excellent (A) |
| 35-40 | good (B) |
| 25-35 | fair (C) |
| below 25 | poor (D) |

Flowability Test:

A coating composition (1 g) is formed, by application of a pressure of 85 kg/cm² into a tablet having a diameter of 16 mm and a thickness of about 3-4 mm. The disc is placed on a horizontal plate and heated at 140° C. for 10 minutes to melt the disc. The melt is then allowed to be cooled to room temperature for solidification. The diameter (D) of the solidified layer on the plate is measured for the calculation of a flowability according to the following equation:

$$\text{Flowability} = \frac{D - 16}{16} \times 100\ (\%)$$

Homogeneity Test:

A coating composition is pulverized into 100 mesh or finer. The pulverized composition is observed whether or not the ingredients are uniformly distributed. The homogeneity is evaluated as follows:

A: Homogeneous

B: One or more ingredients are separated

Gellation Test:

In accordance with JIS C 2104, a coating composition is heated on a hot plate at 200° C. and a period of time required for gelling the composition is measured.

Adhesion Test:

Powder coating is carried out in the same manner as that in above Impact Strength Test. In accordance with JIS K 5400, the bonding of the coat to the plate is evaluated.

A: rank 10: excellent

B rank 8: good

C: rank 6: fair

D: rank 4 or below: poor

TABLE 1

| Example | Gellation Time (sec.) | Flowability (%) | Homogeneity | Edge Covering (%) | Adhesion | Impact Strength |
|---|---|---|---|---|---|---|
| 1 | 15 | 7 | A | 36 | A | A |
| 2 | 13 | 8 | A | 31 | A | A |
| 3 | 23 | 15 | A | 28 | A | B |
| 4 | 30 | 18 | A | 25 | A | B |
| 5 | 28 | 20 | A | 26 | B | B |
| Comp. 1 | 100 | 30 | A | 11 | C-D | D |
| Comp. 2 | 10 | 7 | B | 35 | C | C-D |
| Comp. 3 | 12 | 3 | B | 41 | C-D | D |

EXAMPLE 7

A powder coating composition having the same composition as that of Example 3 except that the 10 parts of the glycidyl ether (II) (Epikote 1004) were replaced by 10 parts of the following epoxy resin:

a mixture of glycidyl ether of bisphenol A (III) (Epikote 828, manufactured by Yuka Shell Epoxy Inc., number average molecular weight: 380) and glycidyl ether (I) (Epikote 1007, number average molecular weight: 2900) with a mixing ratio of the former to the latter being 43:17.

The number average molecular weight of the bisphenol A glycidyl ether-type epoxy resin (i.e. mixture of the glycidyl ether (I) and the above mixture composed of glycidyl ethers (III) and (I)) contained in the above composition is 1700.

EXAMPLE 8

A powder coating composition having the same composition as that of Example 3 except that the 10 parts of the glycidyl ether (II) (Epikote 1004) were replaced by 10 parts of the following epoxy resin:

a mixture of glycidyl ether of bisphenol A (III) (Epikote 828, manufactured by Yuka Shell Epoxy Inc., number average molecular weight: 380) and glycidyl ether of bisphenol A (IV) (Epikote 1009, number average molecular weight: 3800) with a mixing ratio of the former to the latter being 13:47.

The number average molecular weight of the bisphenol A glycidyl ether-type epoxy resin (i.e. mixture of the glycidyl ether (I) and the above mixture composed of glycidyl ethers (III) and (IV)) contained in the above composition is 3000.

EXAMPLE 9

A powder coating composition having the same composition as that of Example 3 except that the 10 parts of the glycidyl ether (II) (Epikote 1004) were replaced by 10 parts of the following epoxy resin:

a mixture of glycidyl ether of bisphenol A (V) (Epikote 1001, manufactured by Yuka Shell Epoxy Inc., number average molecular weight: 900) and glycidyl ether of bisphenol A (VI) (number average molecular weight: 2900) with a mixing ratio of the former to the latter being 8:52.

The number average molecular weight of the bisphenol A glycidyl ether-type epoxy resin (i.e. mixture of the glycidyl ether (I) and the above mixture composed of glycidyl ethers (V) and (VI)) contained in the above composition is 4500.

COMPARATIVE EXAMPLE 4

A powder coating composition having the same composition as that of Example 3 except that the 10 parts of the glycidyl ether (II) (Epikote 1004) were replaced by 10 parts of the following epoxy resin:

a mixture of glycidyl ether of bisphenol A (III) (Epikote 828, manufactured by Yuka Shell Epoxy Inc., number average molecular weight: 380) and glycidyl ether (I) (Epikote 1007, number average molecular weight: 2900) with a mixing ratio of the former to the latter being 50:10.

The weight average molecular weight of the bisphenol A glycidyl ether-type epoxy resin (i.e. mixture of the glycidyl ether (I) and the above mixture composed of glycidyl ethers (III) and (I)) contained in the above composition is 1500.

COMPARATIVE EXAMPLE 5

A powder coating composition having the same composition as that of Example 3 except that the 10 parts of the glycidyl ether (II) (Epikote 1004) were replaced by 10 parts of the following epoxy resin:

glycidyl ether of bisphenol A (VI) (number average molecular weight: 6000)

The number average molecular weight of the bisphenol A glycidyl ether-type epoxy resin (i.e. mixture of the glycidyl ether (I) and the glycidyl ether (VI)) contained in the above composition is 5000.

EXAMPLE 10

Each of the above compositions obtained in Examples 7-9 and Comparative Examples 4 and 5 was tested for edge covering and adhesion of coatings obtained therefrom by a fluidized bed coating method performed at a temperature of 180°-260° C. The test results were as summarized in Table 2 below. The tests were carried out in the same manner as that in Example 5.

TABLE 2

| Example | Edge Covering (%) | Adhesion |
|---|---|---|
| 7 | 24 | B |
| 8 | 30 | B |
| 9 | 36 | B |
| Comp. 4 | 17 | C |
| Comp. 5 | 40 | C-D |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A powder coating composition comprising:
   an epoxy resin containing at least 60% by weight of a mixture of a first glycidyl ether of bisphenol A having a number average molecular weight of 2500-8000% with a second glycidyl ether of bisphenol A having a number average molecular weight of 350-1700 and a melting point of 75° C. or less, said mixture having a number average molecular weight of 1600-4600;
   a carboxyl group-terminated polyester resin in an amount of 5-100 parts by weight per 100 parts by weight of said epoxy resin;
   a curing agent which is different from said carboxyl group-terminated polyester resin; and
   an inorganic filler in an amount of 10-80% by weight.

2. A composition according to claim 1, wherein said mixture has a number average molecular weight of 1800-4000.

3. A composition according to claim 1, wherein said epoxy resin contains up to 40% by weight of a polyfunctional epoxy resin selected from novolak epoxy resins, triglycidyl ether epoxy resins and tetraglycidyl ether epoxy resins.

4. A composition according to claim 1, wherein said polyester resin has a softening point of 75°-90° C., an acid value of 30-150, a weight average molecular weight of 600-2500 and an average particle size of 100-500 μm.

5. A composition according to claim 1, wherein said polyester resin is a copolymer of (a) ethylene glycol with (b) terephthalic acid and (c) sebacic acid or adipic acid, the amount of component (c) being 15-40 molar % based on the total of components (a), (b) and (c).

6. A powder coating composition comprising:

an epoxy resin containing at least 60% by weight of a mixture of a first glycidyl ether of bisphenol A having a number average molecular weight of 2500–8000 with a second glycidyl ether of bisphenol A having a number average molecular weight of 350–1700, said mixture having a number average molecular weight of 1600–4600;

a carboxyl group-terminated polyester resin in an amount of 5–100 parts by weight per 100 parts by weight of said epoxy resin;

an inorganic filler in an amount of 10–80% by weight; and a curing agent comprising a mixture of a first imidazole compound

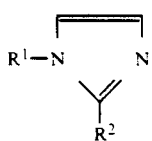

wherein $R^1$ represent hydrogen, an alkyl or an aralkyl and $R^2$ represents an alkyl or aryl, and a second imidazole compound expressed by the general formula:

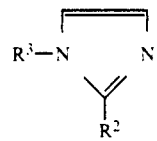

wherein $R^3$ represents a cyanoalkyl or a triazine-containing alkyl and $R^2$ has the same meaning as above.

7. A powder coating composition comprising:

an epoxy resin containing at least 60% by weight of a mixture of a first glycidyl ether of bisphenol A having a number average molecular weight of 2500–8000 with a second glycidyl ether of bisphenol A having a number average molecular weight of 350–500, said mixture having a number average molecular weight of 1600–4600;

a carboxyl group-terminated polyester resin in an amount of 5–100 parts by weight per 100 parts by weight of said epoxy resin;

a curing agent which is different from said carboxyl group-terminated polyester resin; and an inorganic filler in an amount of 10–80% by weight.

* * * * *

UNITED STATES PATENT AND TRADEMARK OFFICE
CERTIFICATE OF CORRECTION

PATENT NO. : 5,043,401
DATED : August 27, 1991
INVENTOR(S) : Kunimitsu MATSUZAKI It is certified that error appears in the above-identified patent and that said Letters Patent is hereby corrected as shown below:

Col. 1, line 26, "failed" should read --fail--.

IN THE CLAIMS:

Col. 8, line 40, "2500-8000%" should read --2500-8000--.

Signed and Sealed this

Twenty-third Day of February, 1993

*Attest:*

STEPHEN G. KUNIN

*Attesting Officer*     *Acting Commissioner of Patents and Trademarks*